United States Patent
Cooper et al.

(10) Patent No.: US 7,381,388 B2
(45) Date of Patent: Jun. 3, 2008

(54) METHOD FOR REMOVING MERCURY FROM A GAS STREAM USING IODINE-DOPED DILUTION GAS

(75) Inventors: John Arthur Cooper, Beaverton, OR (US); Sarah Catherine Fry, Portland, OR (US); Bruce Edward Johnsen, Tigard, OR (US)

(73) Assignee: Cooper Environmental Services LLC, Portland, OR (US)

( * ) Notice: Subject to any disclaimer, the term of this patent is extended or adjusted under 35 U.S.C. 154(b) by 254 days.

(21) Appl. No.: 10/863,039

(22) Filed: Jun. 7, 2004

(65) Prior Publication Data

US 2004/0223896 A1     Nov. 11, 2004

Related U.S. Application Data

(63) Continuation-in-part of application No. 09/962,177, filed on Sep. 24, 2001, now Pat. No. 6,872,370.

(51) Int. Cl.
    *B01D 53/64*     (2006.01)
(52) U.S. Cl. ...................................... 423/210
(58) Field of Classification Search ................ 423/210
    See application file for complete search history.

(56) References Cited

U.S. PATENT DOCUMENTS

| 5,900,042 A | * | 5/1999 | Mendelsohn et al. | .......... 75/742 |
| 2002/0114749 A1 | * | 8/2002 | Cole | .......................... 423/210 |
| 2003/0161771 A1 | * | 8/2003 | Oehr | .......................... 423/210 |

FOREIGN PATENT DOCUMENTS

| EP | 0 289 809 A1 | * | 11/1988 |
| JP | 49-43 197 A | * | 11/1974 |

OTHER PUBLICATIONS

Joseph J. Helble et al. "Control of Mercury Emissions from Coal-Fired Plants" National Center for Environmental Research, Office of Research and Development, U. S. Environmental Protection Agency, EPA Grant No. R828170, dated Nov. 15, 2000, two pages.*

* cited by examiner

*Primary Examiner*—Timothy C. Vanoy
(74) *Attorney, Agent, or Firm*—Goff Patent Law

(57) ABSTRACT

A method for removing mercury, and in particular elemental mercury, from a fluid stream by blending the fluid stream with a second stream comprising iodine. The blended stream is then passed through at least one filter, which is capable of removing oxidized forms of mercury from gas streams.

13 Claims, No Drawings

US 7,381,388 B2

METHOD FOR REMOVING MERCURY FROM A GAS STREAM USING IODINE-DOPED DILUTION GAS

CROSS-REFERENCE TO RELATED APPLICATION

This application is a continuation-in-part of U.S. application Ser. No. 09/962,177, filed on Sep. 24, 2001 now U.S. Pat. No. 6,872,370. The priority of the prior application is expressly claimed and its disclosure is hereby incorporated by reference in its entirety.

BACKGROUND OF THE INVENTION

This invention relates to the removal of mercury (Hg) from gas streams, and in particular, to an apparatus and method for removing Hg, and in particular, elemental Hg from gas streams.

Mercury is a neurotoxin, which when emitted into the environment is of concern for both the health of man and other components of the biosphere. Even though the concentration of mercury in the atmosphere is low, it can be accumulated in the food chains of man and other species. The degree of environmental availability is dependent in part on the chemical form of mercury. Because of the widely recognized health impacts of this element, it has been identified as a key pollutant to be controlled. Some countries and states have banned the use of mercury in industrial processes, and the use of products containing mercury. As such, reduction of the amount of mercury from sources such as products like batteries and fluorescent light bulbs, and the emission of mercury from sources such as industrial processes, incineration, land fills and boilers is critical.

As mercury emission limits become more stringent, analytical methods capable of detecting ever lower mercury levels are required. In some cases, the required sensitivity exceeds that which can be achieved with known analytical methods. As a result, these measuring methods frequently require pre-concentration of the mercury-containing gas stream prior to analysis in order to measure low concentrations of mercury in typical gas streams.

To further complicate matters, mercury and some of its readily-formed compounds are relatively volatile. For example, mercury readily combines with chloride to form mercuric chloride ($HgCl_2$). However, both elemental mercury and mercuric chloride have high vapor pressures at typical ambient and in-stack temperatures. As such, both elemental mercury and mercuric chloride vapor are difficult to remove from a gas stream for emissions control and/or subsequent analysis.

For all of these reasons, removal of mercury from gas streams has been extensively studied, and numerous methods have been reported that purport to effectively remove elemental mercury and mercury compounds from gas streams.

Mercury's propensity to combine with iodine has led to numerous efforts to remove mercury from gas streams by combining the Hg with iodine in some form. For example, Japanese patent JP 49-43197 teaches the removal of mercury from alkali electrolysis cell gas by contacting the gas with an iodide of Li, K, Ca, Mg, Zn, Al, Fe, Ni, or Co, or a compound of the general formula $R_4NI$, where R is H or 1-4C alkyl containing no free $I_2$, and which also includes at least one inorganic reducing agent. The carrier is carbon, a zeolite or silica gel.

JP 50-6438 teaches removal of Hg from gas streams by contacting the gas stream with a cationic exchange resin on which is adsorbed an iodide of Al, Zn, Sr, Fe, Na, Ni, Mg, Li, tetracthylamonium, methylene, naphthalene, o-phenol or benzene. Iodine is optionally loaded onto the resin in addition to the iodide compound.

U.S. Pat. No. 4,474,896 discloses an absorbent for mercury that is a polysulfide-containing adsorbent composition. In one embodiment, the adsorbent is a zeolite that has been treated to contain metal cation capable of forming insoluble polysulfides when exposed to sulfanes in either vapor form or in an organic solution.

While each of these methods is somewhat successful in removing Hg from gas streams, none is capable of doing so quantitatively; i.e., at low concentrations that might be present down stream at mercury controls and capture the mercury in a form that might be applicable to nondestructive analysis procedures such as x-ray fluorescence. As a result, none of these known methods are suitable for Hg removal to the levels required for either thoroughly removing Hg from a process or waste gas stream, for control of emissions, or for quantitative analysis of mercury-containing vapors in a gas stream.

It has been found that certain bio-membrane and resin media will efficiently removed oxidized forms of mercury from gas streams, but do not remove elemental mercury from these gas streams. The addition of chlorine gas to a gas stream containing elemental mercury will convert some of the elemental mercury to mercuric chloride, which could then be removed from the gas stream with the bio-membrane or resin media. However, the conversion of elemental mercury to mercuric chloride is inefficient and complete conversion can not be achieved under typical or generally applicable conditions.

It has also been found that elemental mercury can efficiently be removed from a gas stream by passing the gas stream through a bio-membrane or resin media that had been pre-treated with iodine. However, a limitation of this method is that the iodine on the filter can be transferred to the gas stream passing through the filter. Thus, the time of sampling through a fixed spot is limited to about an hour at normal operating conditions. Similarly, the volume and flow rates through the filter are limited not only by the pressure drop across the filter, but also the increased loss of iodine from the filter at higher volumes sampled. Another limitation of this method is that the gas stream may also contain high concentrations of condensable gases and the material must be used above the dew points for these gases. The high end of the temperature range for the filter is limited to about 200° F. to 250° F. Therefore, the effective temperature range within which the iodine-doped filter can be efficiently applied is limited to about 150° F. to 200° F.

It is desirable in the art to find alternative methods of trapping mercury on filters or other media for removing Hg from a process or waste gas stream, for control of emissions, or for quantitative analysis of mercury-containing vapors in a gas stream.

SUMMARY OF THE INVENTION

It is therefore an object of this invention to provide a method capable of removing mercury vapor from a gas stream.

It is another object of the invention to provide a method to remove volatile mercury-containing compounds from a gas stream.

It is yet another object of the invention to provide a method of removing volatile mercury, mercury-containing solids and mercury-containing compounds from a gas stream in a quantitative manner.

It is still another object of the invention to provide a method of removing all mercury species from a gas stream, including elemental mercury vapor and volatile and particulate mercury-containing compounds, in particular compounds containing oxidized mercury.

These and other objects of the invention are met by preferred embodiments of the invention in which a gas stream containing elemental mercury is blended with a second gas stream containing iodine vapors. The blended stream is then passed through one or more filters, thus removing substantially all of the mercury from the blended stream.

DETAILED DESCRIPTION OF THE INVENTION

The present invention is embodied in a method wherein a gas stream containing elemental mercury is combined with an iodine-containing gas in order to oxidize the element mercury and/or to form a mercury-containing solid. The combined gas stream is then exposed to at least one filter. The mercury-iodine reaction product is removed by gaseous diffusion to the filter. Using this method, substantially all of the elemental mercury is removed from the gas stream.

The iodine-containing gas stream may be formed by providing a solid iodine source and contacting the solid iodine with a gas stream. The solid iodine source may be finely divided iodine. The gas stream is provided at a pre-determined temperature selected to vaporize the solid iodine at a pre-selected rate.

The filter is a bio-membrane or resin-impregnated media. Preferably, as a bio-membrane filter, a polyethersulfone filter paper, such as Pall Corporation Mustang Q or SB6407 can be used. In another preferred embodiment, a carbon-impregnated filter can be used. The filter is capable of removing oxidized forms of mercury from gas streams.

The gas stream containing elemental mercury is diluted with the iodine-containing gas stream, thereby reducing the dew point. Thus, the separation step using the membrane media can be implemented at a lower temperature, thus possibly allowing higher flow rates and lower detection limits.

Iodine can react with other species in a gas stream besides mercury. The concentration of other species may be such that the iodine might preferentially react with and be totally consumed by these other possible reactants, leaving no iodine to react with the mercury. In such situations, it is possible to add anti-oxidants to the gas stream that would inhibit the reaction of iodine with more abundant species.

EXAMPLE

In a specific example, a laboratory gas stream comprising laboratory air and elemental mercury at a concentration of about 100 µg/m$^3$ was provided at room temperature. The laboratory gas stream was blended with a second gas stream comprising iodine at a concentration of about 10 mg/m$^3$. The blended gas stream was then passed through two bio-membrane filters and a carbon-impregnated filter, in that order. More than 98% of the mercury was trapped on the first bio-membrane filter, indicating complete oxidation of the elemental mercury to a form that is efficiently trapped on the filter.

The embodiment described is just one embodiment of the invention. The invention can be applied in many different forms depending on the condition or characteristics of the gas stream, the economics of a particular application, and the objectives of the application. For example, the invention can be used in separation processes including any of filtration, diffusion, filtration and diffusion in combination. The invention is effective for mercury removal at conditions typically associated with coal-fired power plants, gas-fired power plants, incinerators, natural gas purification processes, land fill gas emissions, and many other thermal and chemical processing environments. The methods of the invention can be used for continuous emission monitoring, for intermittent sampling, for removing mercury from a gas stream, for pre-concentration of mercury for analysis, including quantitative analysis.

The foregoing embodiments are intended as illustrative of certain embodiments of the invention, and are not intended to be limiting. Those skilled in the art will recognize that additional sampling, analytical and gas cleaning methods that embody the present invention are possible.

What is claimed is:

1. A method for removing mercury from a gas stream, the method comprising:
   providing a first gas stream comprising mercury;
   providing a second gas stream comprising iodine;
   blending the first gas stream with the second gas stream to provide a blended gas stream; and,
   removing the mercury from the gas stream by passing the blended gas stream through at least one filter, the filter including a polyethersulfone surface.

2. A method according to claim 1 wherein the step of passing the blended gas stream through the at least one filter removes substantially all of the mercury from the blended gas stream.

3. A method according to claim 1 wherein the at least one filter further includes a filter selected from the group consisting of a carbon-impregnated filter, a bio-membrane filter and a resin-impregnated filter.

4. A method according to claim 1 wherein the first gas stream comprises elemental mercury.

5. A method according to claim 1 wherein the first gas steam comprises oxidized forms of mercury.

6. A method according to claim 4 wherein the first gas steam comprises oxidized forms of mercury.

7. A method for removing mercury from a gas stream, the method comprising:
   providing a first gas stream comprising mercury and at least one other oxidizable compound;
   providing a second gas comprising iodine;
   blending the first gas stream with the second gas to provide a blended gas stream and to oxidize at least a portion of the mercury;
   adding at least one anti-oxidants to the first gas stream to inhibit oxidation of the at least one other oxidizable compound; and,
   removing the oxidized mercury from the blended gas stream by passing the blended gas stream through at least one filter.

8. A method according to claim 7 wherein the step of adding anti-oxidants to the first gas stream is performed before the step of blending the first gas stream with the second gas stream.

9. A method of quantitatively removing mercury comprising the steps of:
   providing a first gas stream comprising vapor-phase mercury;

introducing vapor-phase iodine into the first gas stream;
reacting at least a portion of the vapor-phase iodine with a first portion of the mercury in the first gas stream to form at least one mercury-containing solid; and,
removing the at least one mercury-containing solid from the first gas stream
removing unreacted vapor phase mercury from the first gas stream by contacting the first gas stream with a polyethersulfone surface.

10. A method according to claim 9 wherein the step of introducing vapor-phase iodine into the first gas stream includes the steps of:
providing a second gas stream comprising iodine vapor; and,
combining the first and second gas streams.

11. A method according to claim 9 wherein the step of introducing vapor-phase iodine into the first gas stream includes the steps of:
providing a second gas stream;
providing solid iodine; and,
contacting the second gas stream with the solid iodine and vaporizing at least a portion of the solid iodine.

12. A method according to claim 11 wherein the step of providing solid iodine includes the step of providing particulate iodine.

13. A method according to claim 11 wherein the step of contacting the second gas stream with the solid iodine and vaporizing at least a portion of the solid iodine comprises providing the second gas stream at a pre-determined temperature selected to vaporize the solid iodine at a pre-selected rate.

* * * * *

UNITED STATES PATENT AND TRADEMARK OFFICE
CERTIFICATE OF CORRECTION

PATENT NO.         : 7,381,388 B2                                                Page 1 of 1
APPLICATION NO. : 10/863039
DATED              : June 3, 2008
INVENTOR(S)        : John Arthur Cooper, Sarah Catherine Fry and Bruce Edward Johnsen It is certified that error appears in the above-identified patent and that said Letters Patent is hereby corrected as shown below:

Column 4, line 43, please replace "steam" with --stream--
Column 4, line 45, please replace "steam" with --stream--

Signed and Sealed this

Twenty-seventh Day of January, 2009

JOHN DOLL
*Acting Director of the United States Patent and Trademark Office*